United States Patent
Patil et al.

(10) Patent No.: US 6,573,226 B2
(45) Date of Patent: Jun. 3, 2003

(54) USE OF CARBON MONOXIDE CONTAINING POLYMERS AS, ADHESIVE ADDITIVES, AND FLUIDS

(75) Inventors: Abhimanyu Onkar Patil, Westfield, NJ (US); Donald Norman Schulz, Annandale, NJ (US); Michael Gerard Matturro, Lambertville, NJ (US); Richard Henry Schlosberg, Bridgewater, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 36 days.

(21) Appl. No.: 09/883,421

(22) Filed: Jun. 18, 2001

(65) Prior Publication Data

US 2002/0028752 A1 Mar. 7, 2002

Related U.S. Application Data

(60) Provisional application No. 60/219,056, filed on Jul. 18, 2000.

(51) Int. Cl.$^7$ .................. C10M 145/00; C10M 145/18
(52) U.S. Cl. ....................... 508/575; 508/577
(58) Field of Search ................. 508/575, 577

(56) References Cited

U.S. PATENT DOCUMENTS

| | | | |
|---|---|---|---|
| 2,495,286 A | 1/1950 | Brubaker | 260/63 |
| 3,156,774 A | 11/1964 | Boudouris | 179/16 |
| 3,472,918 A * | 10/1969 | Guillet et al. | 522/135 |
| T917,012 I4 | 12/1973 | Mahr | |
| 3,780,140 A | 12/1973 | Hammer | 260/884 |
| 4,024,325 A * | 5/1977 | Hudgin | 528/392 |
| 4,024,326 A | 5/1977 | Hudgin | 526/11.1 |
| 4,473,482 A | 9/1984 | Serres et al. | 252/52 R |
| 4,496,628 A | 1/1985 | Deatcher et al. | 428/337 |
| 4,517,317 A * | 5/1985 | Tada | 521/95 |
| 5,109,047 A | 4/1992 | Aaronson et al. | 524/357 |
| 5,189,192 A | 2/1993 | LaPointe et al. | 556/11 |
| 5,215,647 A * | 6/1993 | Drent et al. | 208/14 |
| 5,225,523 A | 7/1993 | Drent et al. | 528/392 |
| 5,610,236 A | 3/1997 | Bonner | 25/185 |
| 6,156,872 A * | 12/2000 | Patil et al. | 528/392 |
| 6,262,225 B1 * | 7/2001 | Patil et al. | 528/392 |
| 6,444,784 B1 * | 9/2002 | Patil et al. | 528/392 |

FOREIGN PATENT DOCUMENTS

| | | | | |
|---|---|---|---|---|
| DE | 2433722 A | 9/2001 | | B29C/11/04 |
| EP | 0479353 A1 | 9/1991 | | C10M/157/00 |
| EP | 0590942 B1 | 2/1999 | | C08G/67/02 |
| GB | 1394590 | 5/1921 | | C08L/27/06 |
| GB | 1121360 | 7/1968 | | C08F/1/80 |
| GB | 1272614 | 3/1972 | | C10L/1/18 |
| WO | WO87/04174 | 7/1987 | | C08K/3/00 |
| WO | WO91/18043 | 11/1991 | | C08J/5/12 |
| WO | WO93/18108 | 9/1993 | | C09J/173/00 |
| WO | WO99/54277 | 10/1999 | | C07C/67/08 |
| WO | WO9963029 | 12/1999 | | C10M/145/16 |
| WO | WO0116260 A1 | 3/2001 | | C10M/145/18 |

OTHER PUBLICATIONS

Database WPI, Seaction Ch, Week 199715, Derwent Publications Ltd., London, GB; AN 1997–161782, XP002187472 & JP 09 031437 A (Sekisui Chem Ind Co Ltd), Feb. 4, 1997 abstract.

\* cited by examiner

Primary Examiner—Jacqueline V. Howard
(74) Attorney, Agent, or Firm—Estelle C. Bakun; Joseph C. Wang (57) ABSTRACT

The invention relates to a variety of uses for novel carbon monoxide containing polymers. More specifically, the invention employs the use of low molecular weight polymers containing carbon monoxide for use as adhesive additives and as fluids (e.g., solvents and synthetic base stocks).

5 Claims, 4 Drawing Sheets

USE OF CARBON MONOXIDE CONTAINING POLYMERS AS, ADHESIVE ADDITIVES, AND FLUIDS

CROSS REFERENCE TO RELATED APPLICATION

This application is based on Provisional U.S. Ser. No. 60/219,056 filed Jul. 18, 2000.

FIELD OF THE INVENTION

The invention is directed towards using novel carbon monoxide containing compositions as adhesive additives, and fluids (e.g., solvents, synthetic base stocks).

BACKGROUND

Low molecular weight polymers are used in a variety of applications. In particular, they are often used as additives, modifiers and building blocks in the petrochemical industry. More specifically, low molecular weight ethylene carbon monoxide polymers are used in adhesive production and as fluids.

Adhesive Additives:

Hot melt adhesive compositions are known to contain three constituents; namely, a base polymer, a waxy material and a tackifier. The base polymer provides adhesion and toughness to the adhesive in its cooled state. The waxy material acts to initiate the setting and solidification of the heated composition. The tackifier enhances the wetting and adhesion of the composition to the surface onto which it is applied. Ethylene vinyl acetate ("EVA") copolymers have been used to improve hot met adhesion. Additionally, low molecular weight ethylene-carbon monoxide ("E-CO") copolymers and ethylene-carbon monoxide-vinyl monomer ("E-CO—X") terpolymers are known to improve hot melt adhesives. These CO containing polymers are formed from pure feeds which are relatively expensive as are the vinyl acetate containing polymers.

Thus, there remains a need to produce lower cost CO containing polymers for use in hot melt adhesives.

Fluid Applications:

Fluid applications are broad, varied, and complex and each application has its own set of characteristics and requirements. Proper fluid selection and fluid blending practices have a large impact on the success of the operation in which the fluid is used. For instance, in a typical industrial coating operation, a blend of several fluids is used in order to get appropriate solvency properties, including formulation stability, viscosity, flow/leveling, and the like. The fluid blend choice also affects the properties of the dry film, such as gloss, adhesion, etc. Other operations involving the use of fluids and fluid blends include cleaning, printing, delivery of agricultural insecticides and pesticides, extraction processes, use in adhesives, sealants, cosmetics, drilling muds, and countless others.

There are numerous other factors which influence the choice of fluid(s) used such as the scale of production and/or use. More specifically, many fluids are used in large quantities and have therefore been selected because they can be produced economically. Other fluids may have attractive safety characteristics and are thus specifically chosen for use in manufacturing, consumer and commercial environments. Additionally, the fluids may evaporate thereby escaping into the environment. In such applications low volatile solvents would most likely be preferred. Low volatility fluids such as defined herein, are likely to be low tropospheric ozone forming materials thereby providing the user with a clear benefit.

To meet the demands of a particular application, synthetic lubricant fluids (a.k.a., "synlubes") may be made by chemically reacting materials of a specific chemical composition to produce a compound with planned or predictable properties. The resulting base stock may be blended with various additives to improve specific properties. Furthermore, synthetic lubricants may be superior to petroleum oils in specific performance areas. For example, many exhibit higher viscosity index, better thermal stability and low volatility, provide improved fuel economy, longer useful product life and other improved performance features. Synthetic lubes are increasingly being used in industrial and automotive applications. Some of the synthetic lubes used today include polyalphaolefins ("PAO"), polyisobutylenes ("PIB"), polyol esters, aromatic acid esters and silicones ("siloxanes").

Because of the diverse use of fluids, there is always a need to investigate new polymers which can be used in fluid applications. In particular, low cost avenues for producing such polymers are most desirable.

BRIEF DESCRIPTION OF THE FIGURES

| Name | Abbreviation |
| --- | --- |
| Acetone | Ac |
| Acetonitrile | AcN |
| Acetophenone | AcPH |
| Aniline | An |
| Benzene | B |
| 1-bromonaphthalene | BN |
| n butanol | ButA |
| n-butyl acetate | BA |
| Carbon disulfide | CS2 |
| Carbon tetrachloride | CC14 |
| Chlorobenzene | CB |
| Chloroform | C |
| Cyclohexane | CYH |
| Cyclohexanol | CYHOL |
| Cyclohexanone | CYHONE |
| Dibromomethane | DBM |
| O-dichlorobenzene | ODCB |
| Diethylamine | DEA |
| Diethyl ether | DEE |
| N,N-dimethylacetamide | DMA |
| N,N,-dimethylformamide | DMF |
| Dimethyl sulfoxide | DMSO |
| 1,4-dioxane | 1,4D |
| Dipropylamine | DPA |
| Ethanol | EtA |
| Ethyl acetate | EA |
| Ethylbenzene | ETB |
| Ethylene dichloride | EDC |
| Furan | FUR |
| n-heptane | HEP |
| n-hexane | HEX |
| Isophorone | ISOP |
| Methanol | MtA |
| Methylcyclohexane | MCYH |
| Methylene chloride | MC |
| Methyl ethyl ketone | MEK |
| Nitrobenzene | NTROB |
| Nitroethane | NE |

-continued

| Name | Abbreviation |
| --- | --- |
| Nitromethane | NM |
| 2-nitropropane | 2-NP |
| n-pentanol | PentA |
| n-propanol | PrA |
| Propylene carbonate | PC |
| Pyridine | PY |
| Styrene | STY |
| Tetrahydrofuran | THF |
| Tetralin | Tet |
| Toluene | T |
| 1,1,1-trichloroethane | 111TCE |
| Trichloroethylene | TCEY |
| p-xylene | XYL |

SUMMARY OF INVENTION

The instant invention provides a variety of uses for carbon monoxide containing polymers. More specifically, low molecular weight (less than about 50,000, preferably less than about 10,000, more preferably about 200 to 30,000 and most preferably about 200 to about 2000) olefin-carbon monoxide copolymers are the desirable and useful products described herein. Particularly useful are the ethylene-CO copolymers. For example, like ethylene vinyl acetate, ethylene-carbon monoxide polymers can be synthesized with variable runs of crystallizable polyethylenes, punctuated by functionality. In fact, for such applications the low molecular weight low carbon monoxide (less than about 45%, preferably less than 35%) containing copolymers described herein may be preferred to high molecular weight, high carbon monoxide containing copolymers.

The co-polymers provided herein have desirable melting points of less than about 140° C.

Hence, the invention, in one aspect, provides a method for improving hot melt adhesion by using the low molecular weight (less than about 50,000, preferably less than about 10,000, more preferably about 200 to 30,000 and most preferably about 200 to about 2000) CO containing polymers to improve the adhesive properties of a variety of adhesives, specifically those used on substrate materials having both polar and non-polar characteristics such as glass or metal. The polymers taught herein are utilized to improve adhesive properties in accordance with techniques known in the art and in amounts known in the art in which such polymers as EVA polymers are utilized as adhesive additives. Typically such polymers are referred to as the base polymer of an adhesive composition.

An adhesive composition comprising a base polymer, a tackifier and a wax, the improvement comprising utilizing a polymer selected from the group consisting of: i) a non-linear, paraffin-soluble olefin-CO copolymer; ii) a non-linear olefin-CO copolymer derived from non-pure feeds; iii) an olefin-CO—X terpolymer derived from non-pure feeds; and iv) a non-linear CO—X terpolymer; and mixtures thereof and wherein X is selected from the group consisting of free radically polymerizable vinyl monomers and mixtures thereof and wherein a non-pure feed comprises a first feed comprising olefins and a second feed comprising carbon monoxide and wherein when said polymer is (ii) and (iii) the amount of carbon monoxide and olefin combined in said non-pure feed is less than or equal to 95% and wherein said olefins in said first feed comprising olefins are selected from the group consisting of linear and branched $C_2$ to $C_{30}$ olefins, diolefins and mixtures thereof.

An adhesive composition comprising a base polymer, a tackifier and a wax wherein said base polymer is selected from the group consisting of: i) a non-linear, paraffin-soluble olefin-CO copolymer; ii) a non-linear olefin-CO copolymer derived from non-pure feeds; iii) an olefin-CO—X terpolymer derived from non-pure feeds; and iv) a non-linear CO—X terpolymer; and mixtures thereof and wherein X is selected from the group consisting of free radically polymerizable vinyl monomers and mixtures thereof and wherein a non-pure feed comprises a first feed comprising olefins and a second feed comprising carbon monoxide and wherein when said polymer is (ii) and (iii) the amount of carbon monoxide and olefin combined in said non-pure feed is less than or equal to 95% and wherein said olefins in said first feed comprising olefins are selected from the group consisting of linear and branched $C_2$ to $C_{30}$ olefins, diolefins and mixtures thereof.

A method of improving the hot melt adhesive characteristics of a composition comprising blending a tackifier, a wax and a polymer selected from the group consisting of: i) a non-linear, paraffin-soluble olefin-CO copolymer; ii) a non-linear olefin-CO copolymer derived from non-pure feeds; iii) an olefin-CO—X terpolymer derived from non-pure feeds; and iv) a non-linear CO—X terpolymer; and mixtures thereof and wherein X is selected from the group consisting of free radically polymerizable vinyl monomers and mixtures thereof and wherein a non-pure feed comprises a first feed comprising olefins and a second feed comprising carbon monoxide and wherein when said polymer is (ii) and (iii) the amount of carbon monoxide and olefin combined in said non-pure feed is less than or equal to 95% and wherein said olefins in said first feed comprising olefins are selected from the group consisting of linear and branched $C_2$ to $C_{30}$ olefins, diolefins and mixtures thereof.

The invention also provides novel uses in fluid applications. The CO containing co-polymers can be used as fluids in place of, for example conventional solvents, industrial solvents, or synthetic base stocks. Specifically, they can be used as process fluids in a variety of industrial applications or as synthetic base stock components.

A formulated lubricating oil composition comprising additives and a basestock, the improvement comprising utilizing as said basestock a polymer selected from the group consisting of: i) a non-linear, paraffin-soluble olefin-CO copolymer; ii) a non-linear olefin-CO copolymer derived from non-pure feeds; iii) an olefin-CO—X terpolymer derived from non-pure feeds; and iv) a non-linear CO—X terpolymer; and mixtures thereof and wherein X is selected from the group consisting of free radically polymerizable vinyl monomers and mixtures thereof and wherein a non-pure feed comprises a first feed comprising olefins and a second feed comprising carbon monoxide and wherein when said polymer is (ii) and (iii) the amount of carbon monoxide and olefin combined in said non-pure feed is less than or equal to 95% and wherein said olefins in said first feed comprising olefins are selected from the group consisting of linear and branched $C_2$ to $C_{30}$ olefins, diolefins and mixtures thereof.

A lubricating oil composition comprising a) a polymer selected from the group consisting of: i) a non-linear, paraffin-soluble olefin-CO copolymer; ii) a non-linear olefin-CO copolymer derived from non-pure feeds; iii) an olefin-CO—X terpolymer derived from non-pure feeds; and iv) a non-linear CO—X terpolymer; and mixtures thereof and wherein X is selected from the group consisting of free radically polymerizable vinyl monomers and mixtures thereof and wherein a non-pure feed comprises a first feed comprising olefins and a second feed comprising carbon monoxide and wherein when said polymer is (ii) and (iii) the amount of carbon monoxide and olefin combined in said non-pure feed is less than or equal to 95% and wherein said olefins in said first feed comprising olefins are selected from the group consisting of linear and branched $C_2$ to $C_{30}$ olefins, diolefins and mixtures thereof and b) effective amounts of lubricating additives selected from the group consisting of antioxidants, anti-wear additives, extreme pressure additives, friction modifiers, viscosity index modifiers, pour point depressants, detergents, corrosion inhibitors, metal deactivators, seal compatibility additives, demulsifiers, antifoamants and mixtures thereof.

A method for lubricating a surface comprising applying to said surface a polymer selected from the group consisting of: i) a non-linear, paraffin-soluble olefin-CO copolymer; ii) a non-linear olefin-CO copolymer derived from non-pure feeds; iii) an olefin-CO—X terpolymer derived from non-pure feeds; and iv) a non-linear CO—X terpolymer; and mixtures thereof and wherein X is selected from the group consisting of free radically polymerizable vinyl monomers and mixtures thereof and wherein a non-pure feed comprises a first feed comprising olefins and a second feed comprising carbon monoxide and wherein when said polymer is (ii) and (iii) the amount of carbon monoxide and olefin combined in said non-pure feed is less than or equal to 95% and wherein said olefins in said first feed comprising olefins are selected from the group consisting of linear and branched $C_2$ to $C_{30}$ olefins, diolefins and mixtures thereof.

A method for improving the ozone forming potential of a process fluid by at least 10%, said process fluid comprising a first fluid selected from the group consisting of toluene, xylenes, methanol, ethanol, n-butanol, n-pentanol, n-propanol, diacetone alcohol, butyl acetate, propyl acetate, propylene glycol, methyl isobutyl ketone, $C_5$–$C_{10}$ linear ketones, cyclic ketones, methyl t-butyl ether and mineral spirits, and b) a second polymeric fluid wherein the improvement comprises said polymeric fluid being selected from the group consisting of: i) a non-linear, paraffin-soluble olefin-CO copolymer; ii) a non-linear olefin-CO copolymer derived from non-pure feeds; iii) an olefin-CO—X terpolymer derived from non-pure feeds; and iv) a non-linear CO—X terpolymer; and mixtures thereof and wherein X is selected from the group consisting of free radically polymerizable vinyl monomers and mixtures thereof and wherein a non-pure feed comprises a first feed comprising olefins and a second feed comprising carbon monoxide and wherein when said polymer is (ii) and (iii) the amount of carbon monoxide and olefin combined in said non-pure feed is less than or equal to 95% and wherein said olefins in said first feed comprising olefins are selected from the group consisting of linear and branched $C_2$ to $C_{30}$ olefins, diolefins and mixtures thereof.

A method for improving the viscosity and solvency properties of a solvent-borne coating composition comprising a polyketone and a compound selected from the group consisting of acrylic, alkyl, polyester, epoxzy, silicone, cellulosic and derivatives thereof, PVC, and isocyanate based resins, the improvement comprising utilizing as said polyketone a polyketone selected from the group consisting of i) a non-linear, paraffin-soluble olefin-CO copolymer; ii) a non-linear olefin-CO copolymer derived from non-pure feeds; iii) an olefin-CO—X terpolymer derived from non-pure feeds; and iv) a non-linear CO—X terpolymer; and mixtures thereof and wherein X is selected from the group consisting of free radically polymerizable vinyl monomers and mixtures thereof and wherein a non-pure feed comprises a first feed comprising olefins and a second feed comprising carbon monoxide and wherein when said polymer is (ii) and (iii) the amount of carbon monoxide and olefin combined in said non-pure feed is less than or equal to 95% and wherein said olefins in said first feed comprising olefins are selected from the group consisting of linear and branched $C_2$ to $C_{30}$ olefins, diolefins and mixtures thereof.

These and other features, aspects and advantages of the present invention will become better understood with regard to the following description and claims.

DESCRIPTION

The instant invention relates to use of non-alternating olefin CO-containing polymer compositions effective as a) adhesive additives, and b) fluids. In an adhesive, the polymers are as the base polymer typically used to make the adhesive in conjunction with a tackifier and wax. Such adhesive compositions and their preparation are commonly known. All that is necessary is that the polymers described herein be used as the base polymer typically used to prepare the adhesive.

The polymers utilizable as fluids and adhesive additives are selected the group consisting of: i) a non-linear, paraffin-soluble olefin-CO copolymer; ii) a non-linear olefin-CO copolymer derived from non-pure feeds; iii) an olefin-CO—X terpolymer derived from non-pure feeds; and iv) a non-linear CO—X terpolymer; and mixtures thereof and wherein X is selected from the group consisting of free radically polymerizable vinyl monomers and mixtures thereof and wherein a non-pure feed comprises a first feed comprising olefins and a second feed comprising carbon monoxide and wherein when said polymer is (ii) and (iii) the amount of carbon monoxide and olefin combined in said non-pure feed is less than or equal to 95% and wherein said olefins in said first feed comprising olefins are selected from the group consisting of linear and branched $C_2$ to $C_{30}$ olefins, diolefins and mixtures thereof.

As used herein, a non-pure feedstream is a feedstream comprising a first feed comprising olefins and a second feed comprising carbon monoxide where the amount of olefins and carbon monoxide combined is less than or equal to 95 mole %. The non-pure feed can be either a combination of the first and second feed or a co-feed of the first and second feed.

Hence, for the non-pure feeds, it is possible for either of the first olefinic feed or the second CO feed to be a pure feed so long as once the feeds are combined, the amount of olefin in combination with CO is less than or equal to 95 mole %. Additionally, when the feed comprising CO contains ≧90 mole % CO, the remaining 90% of the feed will preferably comprise at least 90 mole % hydrogen. It is also, therefore, possible for each of the first olefinic feed and second CO feed to contain other components. For example, while the first olefinic feed may be a pure feed of vinyl monomers, including olefins, the CO feed may comprise synthesis gas ("syngas") or multi-component synthesis gas ("MCS"). Alternatively, for example, the CO may originate from MCS feeds which contain at least one olefin, carbon monoxide, hydrogen, carbon dioxide, methane and optionally acetylene or paraffins. Typically the first feed comprising olefins will contain $C_3$ to $C_6$ olefins or dienes. If the CO feedstream is not pure and contains components other than CO, it will typically contain up to 90 mole % CO, preferably up to 95 mole % CO.

CO feeds utilizable herein are described in U.S. Pat. No. 6,049,011 to Kiss et al. Preferably, the feedstream comprising CO will be syngas or multi-component syngas. The non-pure feeds will typically contain at least about 10% CO, preferably at least about 15% and at least about 50% olefin, preferable at least about 60%.

Hence the polymers utilizable may be selected form the following:
1) A non-linear, paraffin-soluble olefin-CO copolymer. A more detailed description of these co-polymers can be found in U.S. Pat. No. 6,156,872 herein incorporated by reference.
2) A non-linear olefin-CO copolymer derived from non-pure feeds.
3) An olefin-CO—X terpolymer derived from non-pure feeds. Here again, it should be noted that defining this copolymer as being "derived from non-pure feeds", it is meant to also include co-feeds. For example, one feed could be syngas or multicomponent syngas while the other feed is a pure vinyl acetate. The two feeds combined are the non-pure feed described herein. These copolymers may include paraffin-soluble as well as paraffin insoluble varieties. Typical molecular weights will be in the range of about less than 50,000, more typically about 200 to about 30,000. In a preferred embodiment, the olefin is ethylene.
4) A non-linear CO—X copolymer where X is a free radically polymerizable vinyl monomer.
5) Mixtures of the polymers defined in 1–4.

It should be appreciated by those skilled in the art that the term "terpolymer" as used herein means a macromolecule formed from at least three monomer sources. Similarly, the term "copolymer" is used herein according to its broad meaning of a macromolecule formed from two or more monomer sources. Also, the term "polymer" is used herein according to its broad meaning of a macromolecule formed from at least one monomer source. The term "synthesis gas" (a.k.a., "syngas") refers to a gas mixture comprised predominantly of CO and hydrogen in various proportions and may contain other components in lesser quantities. The term paraffin used herein refers to normal, iso, or straight chain alkanes.

The polymers of this invention may be synthesized using well known free radical polymerization techniques. For example, the CO containing polymers are formed in free radical polymerization processes using organic peroxides as a free radical initiator according to conventional methods. Representative initiators include, but are not limited to, dialkyl peroxides such as ditertiary-butyl peroxide, 2,5-dimethyl-2,5-ditertiary-butyl-peroxyhexane, di-cumyl peroxide; alkyl peroxides such as tertiary-butyl hydroperoxide, tertiary-octyl hydroperoxide, cumene hydroperoxide; aroyl peroxides such as benzoyl peroxide; peroxy esters such as tertiary-butyl peroxypivalate, tertiary-butyl-perbenzoate; and compounds such as azo-bis-isobutyronitrile. Free radical initiators with an appropriate half life at reaction temperatures ranging from about 50° C. to about 230° C. can be used. Of these, t-butyl peroxypivalate, which has a half life of about 10 hours at 66° C., is preferred.

Such feeds and initiators are useful for forming CO-containing polymers under copolymerization conditions at temperatures ranging from about 50 to about 230° C., preferably from about 50 to about 100° C., pressures ranging from about 100 to about 30,000 psig, preferably from about 100 to about 3,000 psig, and in the presence of a free radical initiator.

Preferably the reaction occurs in the presence of a solvent. Suitable solvents include toluene, benzene, dioxane, pentane, heptane, hexane, propylene oxide, cyclohexane, etc. Hexane is preferred.

The polymers and co-polymers utilized herein may be recovered using conventional methods, for example, filtration or evaporation of the diluent. They may be brought into the desired shape using standard forming techniques, such as cold or hot pressing. Alternatively, the polymerization is carried out in such a way that the copolymer is formed in the desired shape, such as by solution polymerization in a thin layer and subsequent removal of the diluent, which yields the co-polymer in the form of a film.

The number average molecular weight ("Mn") of the copolymers utilizable in accordance with the invention can range from about less than 50,000, preferably about 200 to about 30,000.

Because the instant invention employs free-radical polymerization to form its non-linear copolymers, the resulting non-linear copolymers may also be characterized as being non-alternating.

The free radically polymerizable vinyl monomers may be selected from a-olefins (preferably $C_3$ to $C_{30}$ olefins) such as propylene, butene, 1-octene, 1-octadecene, styrene and styrene derivatives such as α-methylstyrene, p-methylstyrene, tetrafloroethylene, vinyl chloride, vinyl acetate, isobutyl vinyl ether, methyl vinyl ketone, 1-vinylpyrrolidone, acrylic acid, methacrylic acid, methylacrylate, methylmethacrylate, acrylonitrile, acrylamide, acrolein, allyl alcohol, allyl chloride, allyl acetate, mixtures thereof, and similar materials. While the vinyl monomer concentration in the feed may range from zero or trace amounts to about 95 mole %, the preferred concentration ranges from about 5 mole % to 80 mole %.

In a preferred embodiment, the olefin-CO—X terpolymer of the invention comprises 40–90 mole % ethylene, 3–40 mole % carbon monoxide, and 5–60 mole % vinyl monomer.

The ratio of the number of monomer units originating in the olefins to the number of carbon atoms originating in carbon monoxide is preferably at most about 99:1 and more preferably in the range of from about 90:1 to about 1:1, and still more preferably from about 95:1 to about 1:1.

The polymers of the invention are non-linear polymers having a total number of branches per 1000 carbon atoms ranging from about 20 to about 300 (for polymer (c) from about 60 to about 300). Because the instant invention employs free-radical polymerization to form its non-linear copolymers, the resulting non-linear copolymers may also be characterized as being non-alternating. Generally speaking, the branches of the polymers (also referred to as "branchiness") are measured by $^{13}C$ solution NMR in deutero chloroform using a $Cr(AcAc)_3$ relaxation agent. The number of $C_1$ branches per 1000 carbon atoms are measured at about 20.1 ppm; the number of $C_2$ branches per 1000 carbon atoms are measured at about 11.3 ppm; the number of $C_3$ are measured at about 14.7 ppm; and the number of $C_4$ branches are measured at about 14.2 ppm.

The degree of branchiness of the copolymer chains and the number of monomer units originating in the monomers with polymerizable carbon—carbon unsaturation relative to the number of carbon atoms originating in carbon monoxide will both, at least in part, determine the regularity of the polymer chains and thereby also some of the properties of the copolymer, for example the crystallinity and solubility. The polymers prepared in accord with this invention include paraffin-soluble as well as paraffin insoluble species. The term "paraffin" as used herein is a normal, iso, or straight chain alkane.

Thus the CO-containing polymer compositions described herein are prepared using well known free radical polymerization techniques. Because the polymers herein are prepared by free-radical polymerization to the resulting non-linear copolymers may also be characterized as being non-alternating.

In a preferred embodiment, the olefin of the copolymer is ethylene. In another preferred embodiment, the vinyl monomer is selected from the group consisting of alpha-olefins, vinyl acetate, neo vinyl ester and mixtures thereof.

It should be appreciated by those skilled in the art that synthetic lubricants prepared from man-made base stocks have uniform molecular structures and, therefore well defined properties that can be tailored to specific applications. Mineral oil base stocks, on the other hand, are prepared from crude oil and are complex mixtures of naturally occurring hydrocarbons. The greater uniformity found in synthetic lubricants generally results in superior performance. For example, synthetic lubricants have excellent thermal stability. As automobile engines are reduced in size to save weight and fuel, they run at higher temperatures and therefore need more thermally stable oil. Because lubricants made from synthetic base stocks have excellent oxidative/thermal stability, very low volatility, and good viscosity indices over a wide range of temperatures, they offer better lubrication and permit longer drain intervals, with less oil vaporization loss between oil changes. The polymers of the instant invention are utilizable in such lubricants as the basestock. Hence, a lubricating oil composition can be formed from the polymers described herein in conjunction with additives commonly used in the art. Such a composition may utilize only the polymer as the basestock, or may utilize it n conjunction with other commonly used basestocks, such as mineral oil, synthetic PAO, ester, wax isomerates, selected aromatics, hydrocrackates, and solvent refined basestocks or mixtures thereof. In such compositions, the polymer will be present in amounts of at least 5 wt % of the total lubricating oil composition. When used in lubricating oils, such polymers will typically have a viscosity index of about 90–150.

The polymers described herein are also useful for improving the ozone forming potential of a process fluid comprised of polymer and a first fluids. By utilizing the instant polymers as the polymer in the process fluid, the resulting fluids ozone forming potetial is at least 10% less than that of the first fluid. This is very beneficial environmentally.

Various measurements of reactivity with respect to ozone formation are known. For instance, reactivities can be measured in environmental smog chambers, or they may be calculated using computer airshed models. See, for instance, Dr. William P. L. Carter, "Uncertainties and Research Needs in Quantifying VOC Reactivity for Stationary Source Emission Controls", presented at the California Air Resources Board (CARB) Consumer Products Reactivity Subgroup Meeting, Sacramento, Calif. (Oct. 17, 1995). Another way to measure the reactivity of a chemical in ozone formation is by using a technique developed by Dr. Carter (supra) at the Center for Environmental Research and Technology (CERT), University of California at Riverside. The CERT techniques measures "incremental reactivities", the incremental amount of ozone that is produced when the chemical is added to an already polluted atmosphere. A list of compounds and their Maximum Incremental Reactivity (MIR) values is available on the internet at http://helium.ucr.edu/~carter/index.html.

As used herein, cellulosic derivatives include, for example nitrocellulosic and cellulosic esters.

The invention is further described in the following non-limiting examples.

EXAMPLES

Example 1: Synthesis of Ethylene-CO Polymers Using MCS Feed

CO containing polymers using a dilute MCS feed was synthesized according to free-radical polymerization techniques as follows:

A 300 ml autoclave reactor was charged with 150 mL pure n-hexane and 0.6 g of a 75% solution of t-butyl peroxypivalate in mineral spirits. (t-Butyl peroxypivalate has a 10 hour half-life at 55° C. in a 0.2 M benzene solution, Swern, *Organic Peroxides*, John Wiley and Sons, 1970, Vol. 1, pp. 82, 87). The reactor was sealed and purged with purified nitrogen. The reactor was then pressurized with the MCS mixture (ethylene 5.4 mole %, carbon monoxide 1.3 mole %, carbon dioxide 7.4 mole %, hydrogen 4.6 mole % and methane 81.3 mole %) to 700 psig. The temperature was raised to 66° C. while stirring and the pressure was maintained for 24 hours. The reactor was allowed to cool to room temperature and was then depressurized. The hexane was removed on a rotary evaporator to obtain the product.

The product was characterized by IR, NMR and GPC. The FTIR spectrum of the product showed a very strong peak at 1715 cm$^{-1}$ due to carbonyl group, indicating incorporation of carbon monoxide in the product. The $^{13}$C NMR of the product indicated that the polymer had 5.1% CO incorporation and a non-linear (branched) polyethylene structure, as indicated by a broad multiplet in the $^{13}$C NMR for the alkyl region at 9–48 ppm and a multiplet at 206–218 for the CO resonance. The GPC of the product indicated a Mn of 320 and a Mw of 420.

Example 2: Synthesis of Ethylene-CO-1-octene Terpolymers

CO containing polymers using a dilute MCS as co-feed with 1-octene was synthesized according to free-radical polymerization techniques as follows:

The polymerization conditions were similar to those set forth in Example 1. A 300 ml autoclave reactor was charged with 150 mL pure n-hexane and 0.6 g of a 75% solution of t-butyl peroxypivalate in mineral spirits. 20 g 1-octene was added in the reactor. The reactor was sealed and purged with purified nitrogen. The reactor was then pressurized with the MCS mixture (ethylene 5.4 mole %, carbon monoxide 1.3 mole %, carbon dioxide 7.4 mole %, hydrogen 4.6 mole % and methane 81.3 mole %) to 700 psig. The temperature was raised to 66° C. while stirring and the pressure was maintained for 24 hours. The reactor was allowed to cool to room temperature and was then depressurized. The hexane and unreacted octane was removed on a rotary evaporator to obtain the 2.9 g of product.

The product was characterized by IR, NMR and GPC. The FTIR spectrum of the product showed a very strong peak at 1715 cm$^{-1}$ due to carbonyl group, indicating incorporation of carbon monoxide in the product. The GPC of the product indicated a Mn of 860 and a Mw of 1010.

Example 3: Synthesis of Ethylene-CO-vinyl Acetate Terpolymers

CO containing polymers using a dilute MCS as co-feed with vinyl acetate was synthesized according to free-radical polymerization techniques as follows:

The polymerization conditions were similar to those set forth in Example 1. A 300 ml autoclave reactor was charged with 150 mL pure n-hexane and 0.6 g of a 75% solution of t-butyl peroxypivalate in mineral spirits. 2 g vinyl acetate was added in the reactor. The reactor was sealed and purged with purified nitrogen. The reactor was then pressurized with the MCS mixture (ethylene 5.4 mole %, carbon monoxide 1.3 mole %, carbon dioxide 7.4 mole %, hydrogen 4.6 mole % and methane 81.3 mole %) to 700 psig. The temperature was raised to 66° C. while stirring and the pressure was maintained for 24 hours. The reactor was allowed to cool to room temperature and was then depressurized. The hexane and unreacted octane was removed on a rotary evaporator to obtain the 2.5 g of product.

The product was characterized by IR, NMR and GPC. The $^{13}$C NMR of the product indicated that the polymer had 9 mole % CO, 56 mole % ethylene and 35 mole % vinyl acetate. The GPC of the product indicated a Mn of 730 and a Mw of 1620.

Example 4: Synthesis of Ethylene-CO-vinyl Neo-10 Ester Terpolymers

CO containing polymers using a dilute MCS as co-feed with neo vinyl ester (Exxar™ Neo-10) was synthesized according to free-radical polymerization techniques as follows:

The polymerization conditions were similar to those set forth in Example 1. A 300 ml autoclave reactor was charged with 150 mL pure n-hexane and 0.6 g of a 75% solution of t-butyl peroxypivalate in mineral spirits. 5 g neo vinyl ester (Exxar™ Neo-10) was added in the reactor. The reactor was sealed and purged with purified nitrogen. The reactor was then pressurized with the MCS mixture (ethylene 5.4 mole %, carbon monoxide 1.3 mole %, carbon dioxide 7.4 mole %, hydrogen 4.6 mole % and methane 81.3 mole %) to 700 psig. The temperature was raised to 66° C. while stirring and the pressure was maintained for 24 hours. The reactor was allowed to cool to room temperature and was then depressurized. The hexane and unreacted neo vinyl ester was removed initially on a rotary evaporator and then on Kugelrohr apparatus to obtain the 1.9 g of product.

The $^{13}$C NMR of the product indicated that the polymer had 4.6 mole % CO, 48 mole % ethylene and 47.4 mole % neo vinyl ester (Exxar™ Neo-10). The GPC of the product indicated a Mn of 1450 and a Mw of 2100.

Example 5: Synthesis of Ethylene-CO-vinyl Neo-10 Ester Terpolymers

CO containing polymers using a dilute MCS as co-feed with neo vinyl ester (Exxar™ Neo-10) was synthesized according to free-radical polymerization techniques as follows:

The polymerization conditions were similar to those set forth in Example 1. A 300 ml autoclave reactor was charged with 150 mL pure n-hexane and 0.6 g of a 75% solution of t-butyl peroxypivalate in mineral spirits. 2 g neo vinyl ester (Exxar™ Neo-10) was added in the reactor. The reactor was sealed and purged with purified nitrogen. The reactor was then pressurized with the MCS mixture (ethylene 5.4 mole %, carbon monoxide 1.3 mole %, carbon dioxide 7.4 mole % hydrogen 4.6 mole % and methane 81.3 mole %) to 700 psig. The temperature was raised to 66° C. while stirring and the pressure was maintained for 24 hours. The reactor was allowed to cool to room temperature and was then depressurized. The hexane and unreacted neo vinyl ester was removed initially on a rotary evaporator and then on Kugelrohr apparatus to obtain the product.

The $^{13}$C NMR of the product indicated that the polymer had 7.9 mole % CO, 55.6 mole % ethylene and 36.4 mole % neo vinyl ester (Exxar™ Neo-10). The GPC of the product indicated a Mn of 970 and a Mw of 1300.

Example 6: Synthesis of CO-1-octene Copolymer.

A 300 ml autoclave reactor was charged with 150 mL pure n-hexane and 0.6 g of a 75% solution of t-butyl peroxypivalate in mineral spirits. 10 g 1-octene was added in the reactor. The reactor was sealed and purged with purified nitrogen. The reactor was then pressurized with CO to 700 psig. The temperature was raised to 66° C. while stirring and the pressure was maintained for 24 hours. The reactor was allowed to cool to room temperature and was then depressurized. The hexane and unreacted octane was removed on a rotary evaporator to obtain the 1.38 g of product.

The FTIR spectrum of the product showed a very strong peak at 1711 cm$^{-1}$ due to carbonyl group, indicating incorporation of carbon monoxide in the product. The $^{13}$C NMR of the product indicated that the polymer had 27 mole % CO and 73 mole % 1-octene. The GPC of the product indicated a Mn of 965 and a Mw of 1175.

Example 7: Synthesis of Ethylene-CO-alpha-olefin Terpolymers Using Syngas

A 300-mL autoclave engineer's reactor was charged with 150 mL pure n-hexane and 0.64 g of a 75% solution of t-butyl peroxypivalate in mineral spirits. The reactor was sealed and purged with purified nitrogen. The reactor was then pressurized with an ethylene and syngas mixture (ethylene:carbon monoxide:hydrogen 70:15:15, respectively). Then 5.9 g of 1-butene was added, the temperature was raised to 66° C. while stirring, and the pressure was maintained for 24 hours. The reactor was allowed to cool to room temperature and then depressurized. The hexane was removed on a rotary evaporator leaving 7.0 g of the product.

The IR spectrum of the product showed a very strong peak at 1711 cm$^{-1}$ due to the carbonyl group. Thus, CO has been incorporated in the product. The NMR of the product suggested that the polymer had 29.6% CO incorporation. The NMR spectrum of the terpolymer suggested that it has 101 branches per 1000 carbons versus 65.5 branches per 1000 carbons obtained in a control experiment without the 1-butene termonomer. This observation indicates that increased branching may result from alpha-olefin incorporation in the polymer. The GPC of the product indicates a Mn of 500 and Mw of 1000 (polystyrene standards, THF solvent).

Example 8: Synthesis of Ethylene-CO-alpha-olefin Terpolymers Using Syngas

A 300-mL autoclave engineer's reactor was charged with 150 mL pure n-hexane and 0.64 g of a 75% solution of t-butyl peroxypivalate in mineral spirits. The reactor was sealed and purged with purified nitrogen. The reactor was then pressurized with an ethylene and syngas mixture (ethylene:carbon monoxide:hydrogen 70:15:15, respectively). Then 5.9 g of propylene was added, the temperature was raised to 66° C. while stirring, and the pressure was maintained for 24 hours. The reactor was allowed to cool to room temperature and was then depressurized. The hexane was removed on a rotary evaporator, leaving 7.6 g of the product.

The IR spectrum of the product showed a very strong peak at 1711 cm$^{-1}$ due to the carbonyl group. Thus, CO has been incorporated in the product. The NMR of the product suggested that the polymer had 17.5% CO incorporation. The NMR spectrum of the terpolymer suggested that it has 72.8 branches per 1000 carbons versus 65.5 branches per 1000 carbons obtained in a control experiment without the propylene termonomer. This observation indicates that increased branching may result from alpha-olefin incorporation in the polymer. The GPC of the product indicated a Mn of 500 and Mw of 1000 (polystyrene standards, THF solvent).

Example 9: Synthesis of Ethylene-CO-alpha-olefin Terpolymers Using Syngas

A 300-mL autoclave engineer's reactor was charged with 150 mL pure n-hexane and 0.64 g of a 75% solution of t-butyl peroxypivalate in mineral spirits. The reactor was sealed and purged with purified nitrogen. The reactor was then pressurized with an ethylene and syngas (ethylene:carbon monoxide:hydrogen 70:15:15, respectively) mixture. Then 10.8 g of 2-butene was added, the temperature was raised to 66° C. while stirring, and the pressure was maintained for 24 hours. The reactor was allowed to cool to room temperature and then depressurized. The hexane was removed on a rotary evaporator, leaving 6.7 g of the product.

The IR spectrum of the product showed a very strong peak at 1711 cm$^{-1}$ due to the carbonyl group. Thus, CO has been incorporated in the product. The NMR of the product suggested that the polymer had 18.2% CO incorporation. The NMR spectrum of the terpolymer suggested that it has 93.2 branches per 1000 carbons versus 65.5 branches per 1000 carbons obtained in a control experiment without 2-butene termonomer. This observation indicates that increased branching may result from alpha-olefin incorporation in the polymer. The GPC of the product indicated a Mn of 590 and Mw of 1120 (polystyrene standards, THF solvent).

The foregoing examples clearly demonstrate how the novel polymers of the instant invention can be made using inexpensive non-pure feeds.

Example 10-Synthesis of Ethylene-CO-vinyl Acetate Terpolymer

A 300-mL autoclave engineer's reactor was charged with 150 mL pure n-hexane, 0.507 g of t-butyl peroxide and 5 g of inhibitor removed vinyl acetate. The reactor was sealed and purged with purified nitrogen. The reactor was then pressurized with ethylene and carbon monoxide (80:20) mixture. The temperature was raised to 120° C. while stirring, and the pressure was maintained at 700 psig for 24 hours. The reactor was allowed to cool to room temperature and depressurized. Hexane was removed using a rotary evaporator, leaving 10.38 g of the product.

The IR spectrum of the product showed two carbonyl peaks at 1736 and 1713 cm$^{-1}$ due to the ester and ketone groups respectively. Thus, CO and vinyl acetate has been incorporated in the product. NMR of the product suggested that the polymer had 22.4% CO and 9.1% vinyl acetate incorporation. The NMR also suggested that there are 90 branches 100° C. GPC of the product indicated a Mn of 390 and Mw of 840 (polystyrene standards, THF solvent). The viscosity index (VI) of the product was 97 (viscosity 132.26 cS at 100° C. and 4239.38 cS at 40° C.) suggesting that the product can be used as a synthetic base-stock.

Example 11: Synthesis of Ethylene-CO-vinyl Acetate Terpolymer Using Syngas Feed

A 300-mL autoclave engineer's reactor was charged with 140 mL pure n-hexane and 0.641 g of t-butyl peroxide. The reactor was sealed and purged with purified nitrogen. The reactor was then pressurized with ethylene carbon monoxide and hydrogen (70:15:15) mixture. The temperature was raised to 120° C. while stirring and 2 g inhibitor removed vinyl acetate was then added via stainless steal addition vessel. The pressure was maintained at 700 psig for 24 hours. The reactor was allowed to cool to room temperature and depressurized. Hexane was removed using a rotary evaporator, leaving 6.06 g of the product.

The IR spectrum of the product showed two carbonyl peaks at 1736 and 1713 cm$^{-1}$ due to the ester and ketone groups respectively. Thus, CO and vinyl acetate has been incorporated in the product. NMR of the product suggested that the polymer had 20% CO and 7% vinyl acetate incorporation. The NMR also suggested that there are 135.7 branches/100°C. GPC of the product indicated a Mn of 1140 and Mw of 2040 (polystyrene standards, THF solvent). The viscosity index (VI) of the product was 106 (viscosity 28.15 cS at 100° C. and 332.92 cS at 40° C.) suggesting that the product can be used as a synthetic base-stock.

Figure 1:
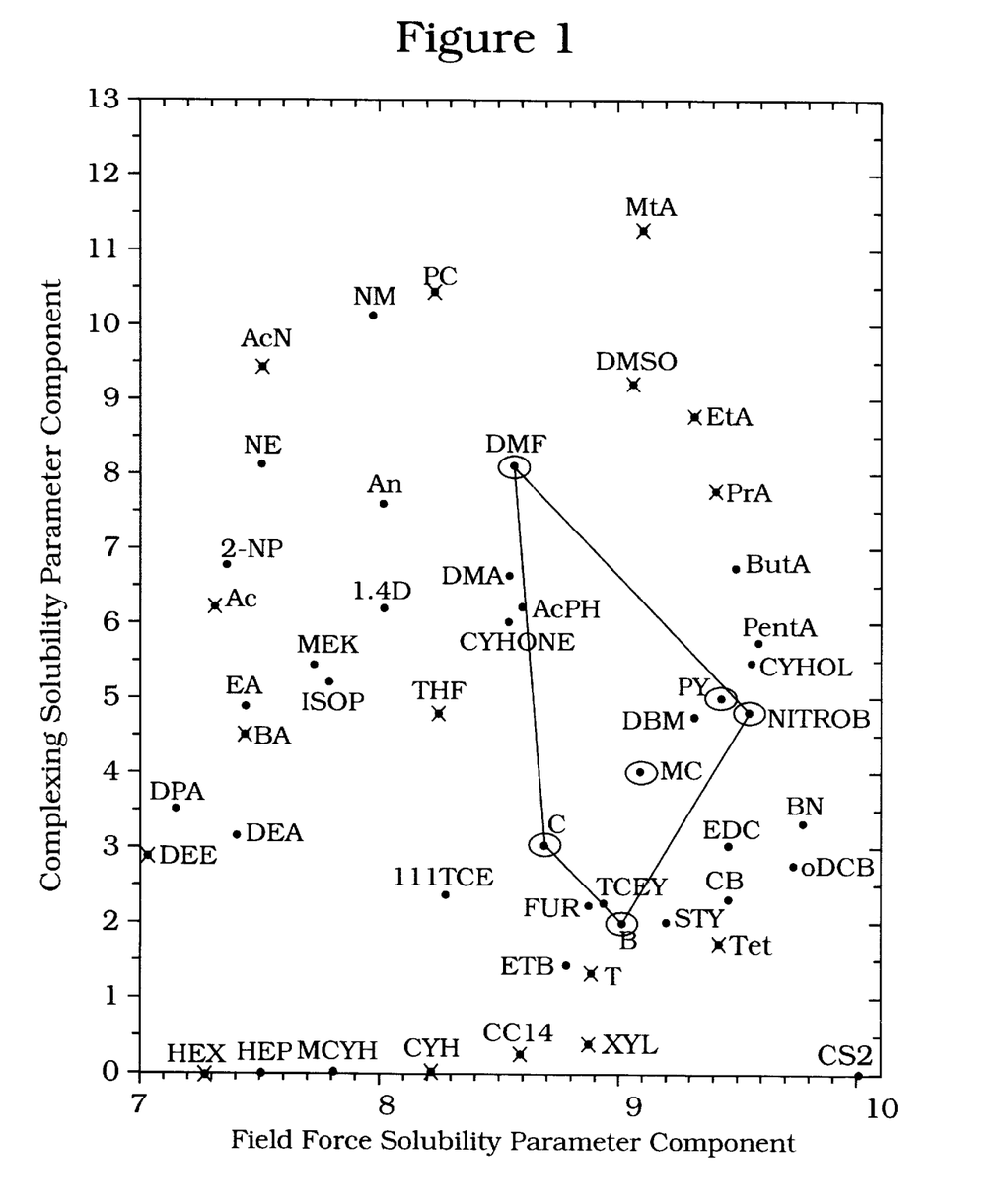
FIGS. 1, 2, 3, and 4 depict a two dimensional solubility parameter space with a point characterizing the solvent power of each liquid. X indicates insolubility and o indicates solubility. The complexing solubility parameter component is plotted against the field force solubility parameter component. The method is as described in "Polygon Mapping With Two-Dimensional Solubility Parameters, Irwin Wiehe, Ind. Eng. Chem. Res., Volume # 34, #2, (1995) P661–673. The abbreviations are as follows.
Figure 2:
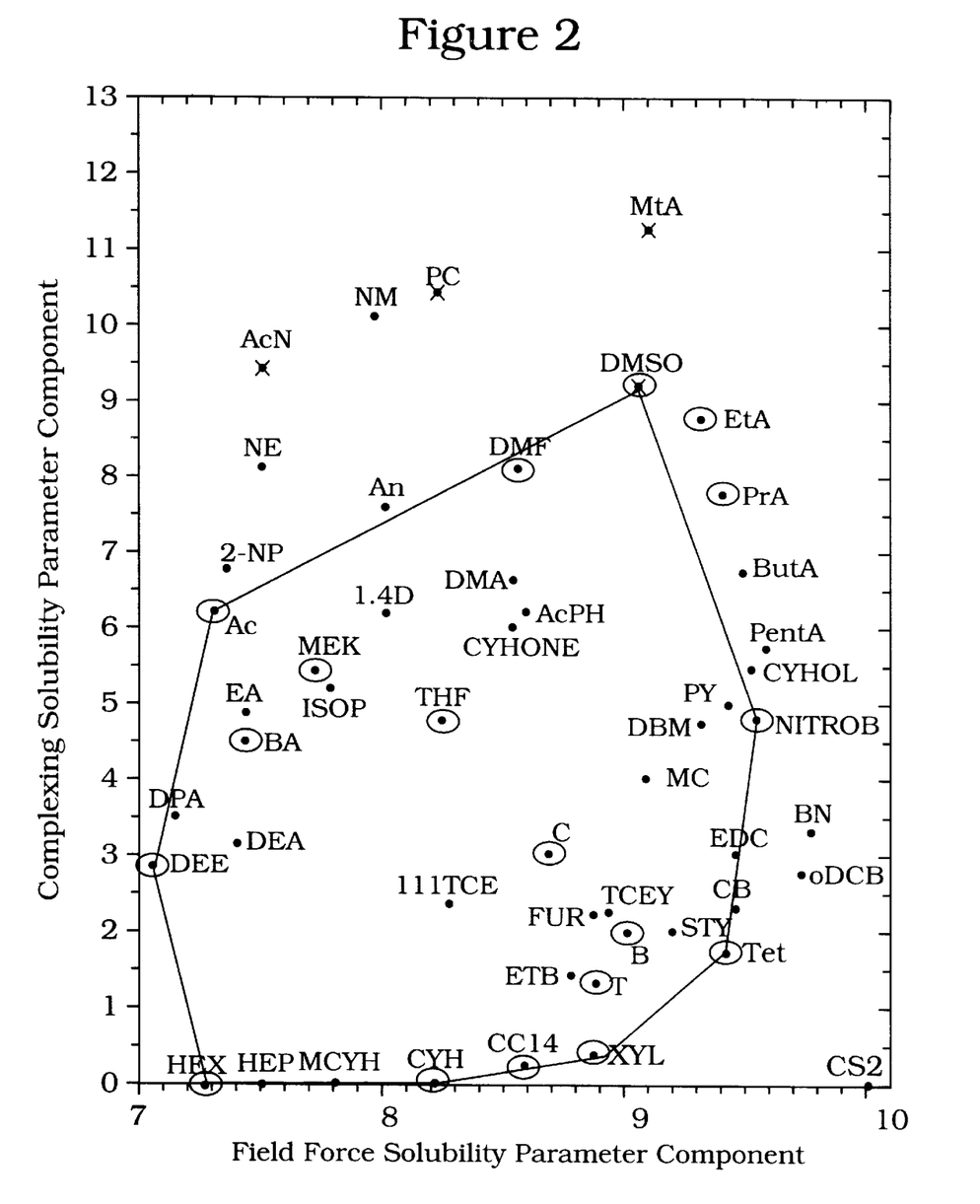
Figure 3:
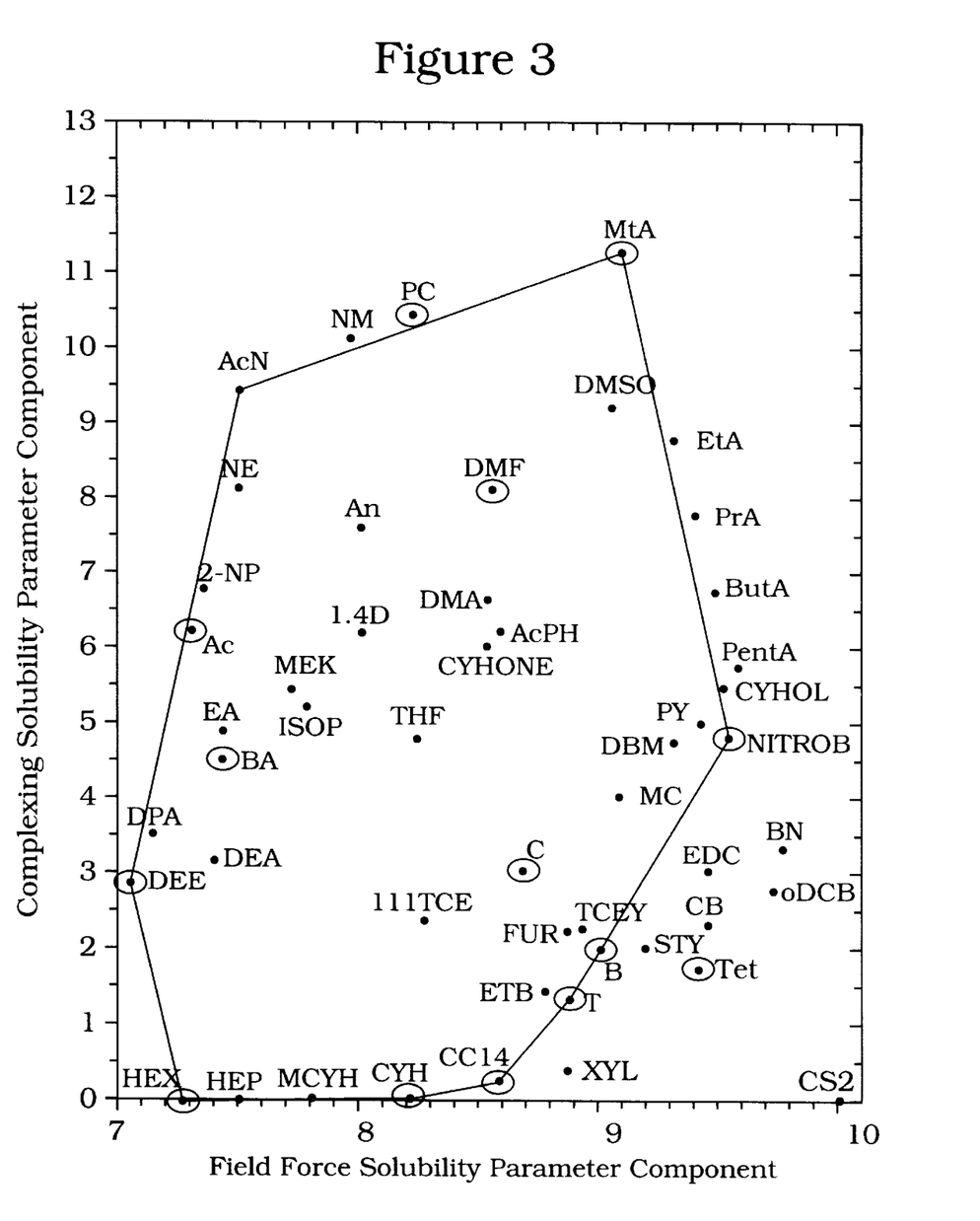
Figure 4:
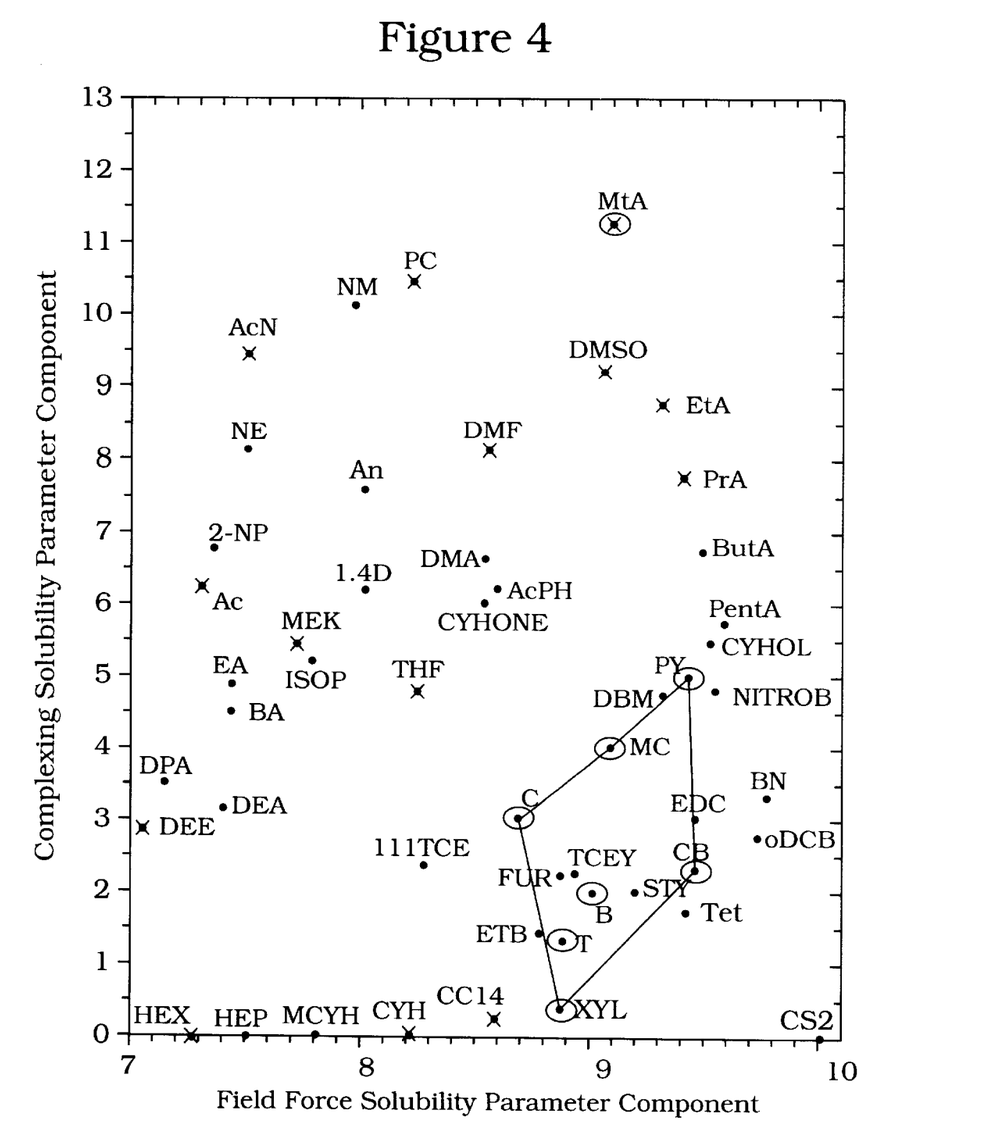

The solubility parameters for four different samples were evaluated and the results are shown in FIGS. 1–4 respectively.

| Example | Feed CO:H$_2$ | α-Olefin (g) | Yield (g) | NMR % CO | GPC Mn | GPC Mw | Branches/ (100° C.) |
|---|---|---|---|---|---|---|---|
| A (I) | 50:50 | 1-butene | 0.98 | 18.8 | 31 | 53 | — |
| B | 70/15/15 | — | 4.3 | 19.3 | 590 | 1100 | 171.8 |
| C (I) | 70/15/15 | 1-butene | 7.0 | 29.6 | 500 | 1000 | 101 |
| D | ECO 80/20 | — | 6.91 | 25.9 | 350 | 750 | 96 |

(I) t-butyl peroxypivalate (O.48G), 66° C., 700 psig, 150 mL hexane, 24h.

What is claimed is:

1. A formulated lubricating oil composition comprising additives and a basestock, the improvement comprising utilizing as said basestock a polymer selected from the group consisting of: i) a non-linear, paraffin-soluble olefin-CO copolymer; ii) a non-linear olefin-CO copolymer derived from non-pure feeds; iii) an olefin-CO—X terpolymer derived from non-pure feeds; and iv) a non-linear olefin CO—X terpolymer; and mixtures thereof and wherein X is selected from the group consisting of free radically polymerizable vinyl monomers and mixtures thereof and wherein a non-pure feed comprises a first feed comprising olefins and a second feed comprising carbon monoxide and wherein when said polymer is (ii) and (iii) the amount of carbon monoxide and olefin combined in said non-pure feed is less than or equal to 95% and wherein said olefins in said first feed comprising olefins are selected from the group consisting of linear and branched C$_2$ to C$_{30}$ olefins, diolefins and mixtures thereof.

2. A lubricating oil composition comprising a) a polymer selected from the group consisting of: i) a non-linear, paraffin-soluble olefin-CO copolymer; ii) a non-linear olefin-CO copolymer derived from non-pure feeds; iii) an olefin-CO—X terpolymer derived from non-pure feeds; and iv) a non-linear olefin CO—X terpolymer; and mixtures thereof and wherein X is selected from the group consisting of free radically polymerizable vinyl monomers and mixtures thereof and wherein a non-pure feed comprises a first feed comprising olefins and a second feed comprising carbon monoxide and wherein when said polymer is (ii) and (iii) the amount of carbon monoxide and olefin combined in said non-pure feed is less than or equal to 95% and wherein said olefins in said first feed comprising olefins are selected from the group consisting of linear and branched $C_2$ to $C_{30}$ olefins, diolefins and mixtures thereof and b) effective amounts of lubricating additives selected from the group consisting of antioxidants, anti-wear additives, extreme pressure additives, friction modifiers, viscosity index modifiers, pour point depressants, detergents, corrosion inhibitors, metal deactivators, seal compatibility additives, demulsifiers, antifoamants and mixtures thereof.

3. A method for lubricating a surface comprising applying to said surface a polymer selected from the group consisting of: i) a non-linear, paraffin-soluble olefin-CO copolymer; ii) a non-linear olefin-CO copolymer derived from non-pure feeds; iii) an olefin-CO—X terpolymer derived from non-pure feeds; and iv) a non-linear olefin CO—X terpolymer; and mixtures thereof and wherein X is selected from the group consisting of free radically polymerizable vinyl monomers and mixtures thereof and wherein a non-pure feed comprises a first feed comprising olefins and a second feed comprising carbon monoxide and wherein when said polymer is (ii) and (iii) the amount of carbon monoxide and olefin combined in said non-pure feed is less than or equal to 95% and wherein said olefins in said first feed comprising olefins are selected from the group consisting of linear and branched $C_2$ to $C_{30}$ olefins, diolefins and mixtures thereof.

4. The lubricating oil of claim 1 wherein said polymer is present in a concentration of at least about 5 wt % of the composition.

5. The lubricating oil of claim 1 wherein said polymer has a viscosity index of about 90 to about 150.

* * * * *